United States Patent [19]
Schott

[11] Patent Number: 5,487,318
[45] Date of Patent: Jan. 30, 1996

[54] SHIFT FORK ACTUATED POSITION SENSOR

[75] Inventor: Allan N. Schott, Warren, Canada

[73] Assignee: New Holland North America, Inc., New Holland, Pa.

[21] Appl. No.: 353,222

[22] Filed: Dec. 1, 1994

[51] Int. Cl.$^6$ ................................................ F16H 57/02
[52] U.S. Cl. ................................. 74/606 R; 74/473 R
[58] Field of Search .................... 74/335, 606 R, 74/473 R; 477/99; 340/457.3

[56] References Cited

U.S. PATENT DOCUMENTS

| | | | |
|---|---|---|---|
| 4,145,883 | 3/1979 | Forster | 60/458 |
| 4,708,027 | 11/1987 | Stenner | 74/606 R X |
| 5,009,125 | 4/1991 | Machida et al. | 74/606 R |
| 5,179,869 | 1/1993 | Reynolds | 74/473 R |
| 5,361,650 | 11/1994 | Klecker et al. | 74/606 R |

*Primary Examiner*—Charles A. Marmor
*Assistant Examiner*—Peter Kwon
*Attorney, Agent, or Firm*—Larry W. Miller; Frank A. Seemar

[57] ABSTRACT

A shift fork assembly for a tractor transmission is disclosed wherein the shift fork assembly is mounted directly to the transmission cover to be removable therewith. The shift fork assembly includes shift forks mounted directly to the shift rails for movement therewith, the shift rail detent mechanism, the shift fork position adjustment mechanism and shift fork position sensors, and is removable from the transmission housing as a unit to facilitate the servicing thereof at a location remote from the transmission housing. The transmission cover onto which the shift fork assembly is mounted is also provided with a secondary cover to permit access to the shift fork position adjustment mechanism to allow positional adjustment of the shift forks relative to both the corresponding shift rail and the corresponding shift collar engageable by the shift forks. The shift fork position sensors are mounted on the secondary cover to be actuated directly by the shift forks and to be removable from the transmission housing as a unit for convenient servicing thereof.

6 Claims, 3 Drawing Sheets

SHIFT FORK ACTUATED POSITION SENSOR

BACKGROUND OF THE INVENTION

This invention relates generally to off-road motor vehicles, such as tractors, and more particularly, to a transmission having shift fork assemblies engageable with slidable shift collars associated with synchronizers to effect a shifting from one gear to another.

Tractor transmissions typically utilize at least two gear shifting assemblies to provide several ranges of gear selections and a plurality of individual gear selections within each range. The shifting of gears to make a selection of ranges or gears within the selected range normally involve the sliding movement of a shift fork on a shift rail to effect the corresponding sliding movement of a shift collar.

The mounting of the shift fork assembly within the transmission requires a positional adjustment of the shift fork relative to the corresponding gear or synchronizer so that proper positional relationships therebetween can be attained and maintained. The servicing of shift fork assemblies is also a concern as shift forks require disassembly and replacement on a periodic basis. The losing of small parts, such as are found in the detents used for holding the shift forks in a selected position, within the transmission is completely unacceptable as such parts can find their way between intermeshing gears to damage expensive transmission components.

Control systems for tractor transmissions require that the transmission be in neutral before the engine can be started. Since the selection of gears, and therefore the speed of operation of the output of the transmission, is accomplished through the manipulation of two or more shift forks, position sensors are operatively coupled to the shift forks to identify when the respective shift fork is in its neutral position. A common practice is to locate the position sensors on the shift rail internally of the transmission housing. This type of design does not monitor the actual location of the shift fork. For example, a loose or mis-adjusted shift fork/shift rail assembly could result in a false shift status signal.

Accordingly, it would be desirable to provide a shift fork position sensor that would be cooperable directly with the shift fork to signal its status in the neutral position.

SUMMARY OF THE INVENTION

It is an object of this invention to overcome the aforementioned disadvantages of the prior art by providing a shift fork position sensor that is cooperable directly with the shift fork to identify the status of the shift fork in its neutral position.

It is another object of this invention to provide a tractor transmission that utilizes a shift fork assembly mounted to the transmission cover to be removable from the transmission housing as a unit.

It is still another object of this invention to mount the shift fork position sensors on the secondary cover to be closely cooperable with the shift forks to sense movement thereof directly.

It is an advantage of this invention that the shift fork position sensors can be removed from the transmission to be serviced at a location remote from the transmission housing.

It is a feature of this invention that the shift fork assembly can be removed from the transmission as a unit to facilitate servicing thereof.

It is another advantage of this invention that the reliability of the signal from the shift fork position sensor is improved.

It is another feature of this invention that the shift fork position sensor is directly actuated by the shift fork.

It is still another object of this invention to improve the serviceability of a tractor transmission.

It is yet another object of this invention to provide shift fork position sensors for a tractor transmission which are durable in construction, inexpensive of manufacture, carefree of maintenance, facile in assemblage, and simple and effective in use.

These and other objects, features and advantages are accomplished according to the instant invention by providing a shift fork assembly for a tractor transmission wherein the shift fork assembly is mounted directly to the transmission cover to be removable therewith. The shift fork assembly includes shift forks mounted directly to the shift rails for movement therewith, the shift rail detent mechanism, the shift fork position adjustment mechanism and shift fork position sensors, and is removable from the transmission housing as a unit to facilitate the servicing thereof at a location remote from the transmission housing. The transmission cover onto which the shift fork assembly is mounted is also provided with a secondary cover to permit access to the shift fork position adjustment mechanism to allow positional adjustment of the shift forks relative to both the corresponding shift rail and the corresponding shift collar engageable by the shift forks. The shift fork position sensors are mounted on the secondary cover to be actuated directly by the shift forks and to be removable from the transmission housing as a unit for convenient servicing thereof.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
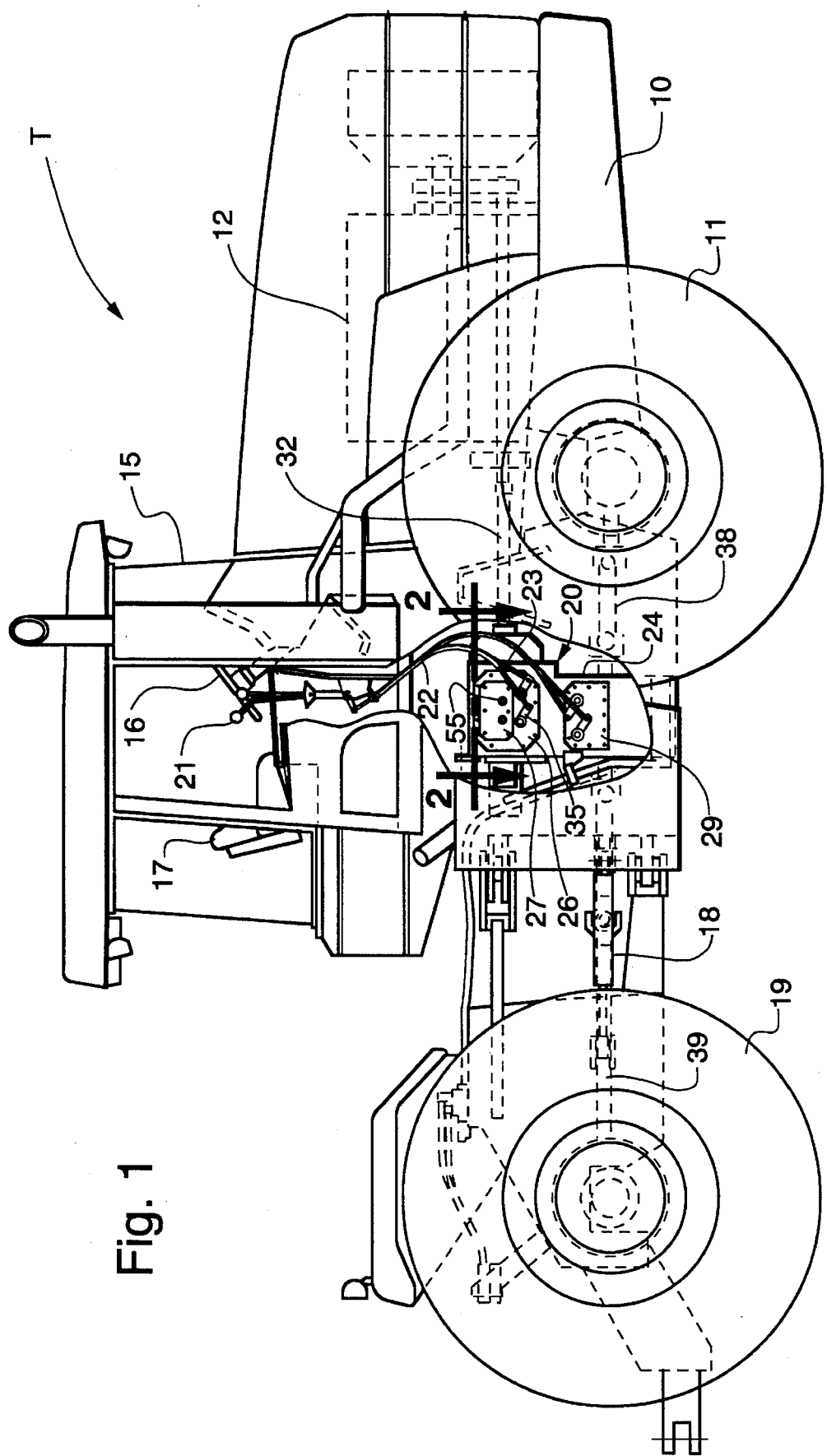
FIG. 1 is a side elevational view of a tractor incorporating the principles of the instant invention, a portion of the tractor being broken away to better shown the transmission and the controls for effecting a shifting of the transmission.

Referring now to the drawings and, particularly, to FIG. 1, a representative view of an agricultural tractor incorporating the principles of the instant invention can best be seen. Left and right references are used as a matter of convenience and are determined by standing at the rear of the tractor and facing the forward end in the normal direction of travel. The tractor chassis 10 is supported above the ground in a conventional manner by front wheels 11, which on large tractors are typically drivingly powered, and rearward drive wheels 19 rotatably mounted in a customary transversely spaced orientation.

The chassis supports a conventional engine 12 serving to provide operational power for the tractor T and an operator's cab 15 positioned in an elevated location. The operator's cab 15 includes a steering wheel 16, positioned forwardly of the conventional operator's seat 17, to operate the steering of the front wheels 11 through manipulation of the hydraulic cylinder 18 controlling the articulation of the tractor chassis 10 in a known conventional manner. The operator's cab 15 is also provided with conventional operative controls, such as the transmission control lever 21, to permit the operative control of the tractor T.

The tractor T is provided with a transmission 20 supported on the chassis 10 to receive rotational power from the engine 12 and transfer rotational power to the front and rear wheels 11, 19 at selected speeds of operation. The transmission control lever 21, which is mounted in the operator's cab 15 within normal reach of the operator's seat 17, effects a shifting of the available speeds of operation through a push/pull cable 2, as will be described in greater detail below. The transmission 20 is divided between an upper part 23, housing a set of first gears 31 for providing various speeds of operation for a given input rotational speed from the engine 12, and a lower part 24, providing a set of second gears 36 operatively engaged with the set of first gears 31 to provide a plurality of ranges of speeds of operation through which each of the speeds of operation are operable.

Figure 2:
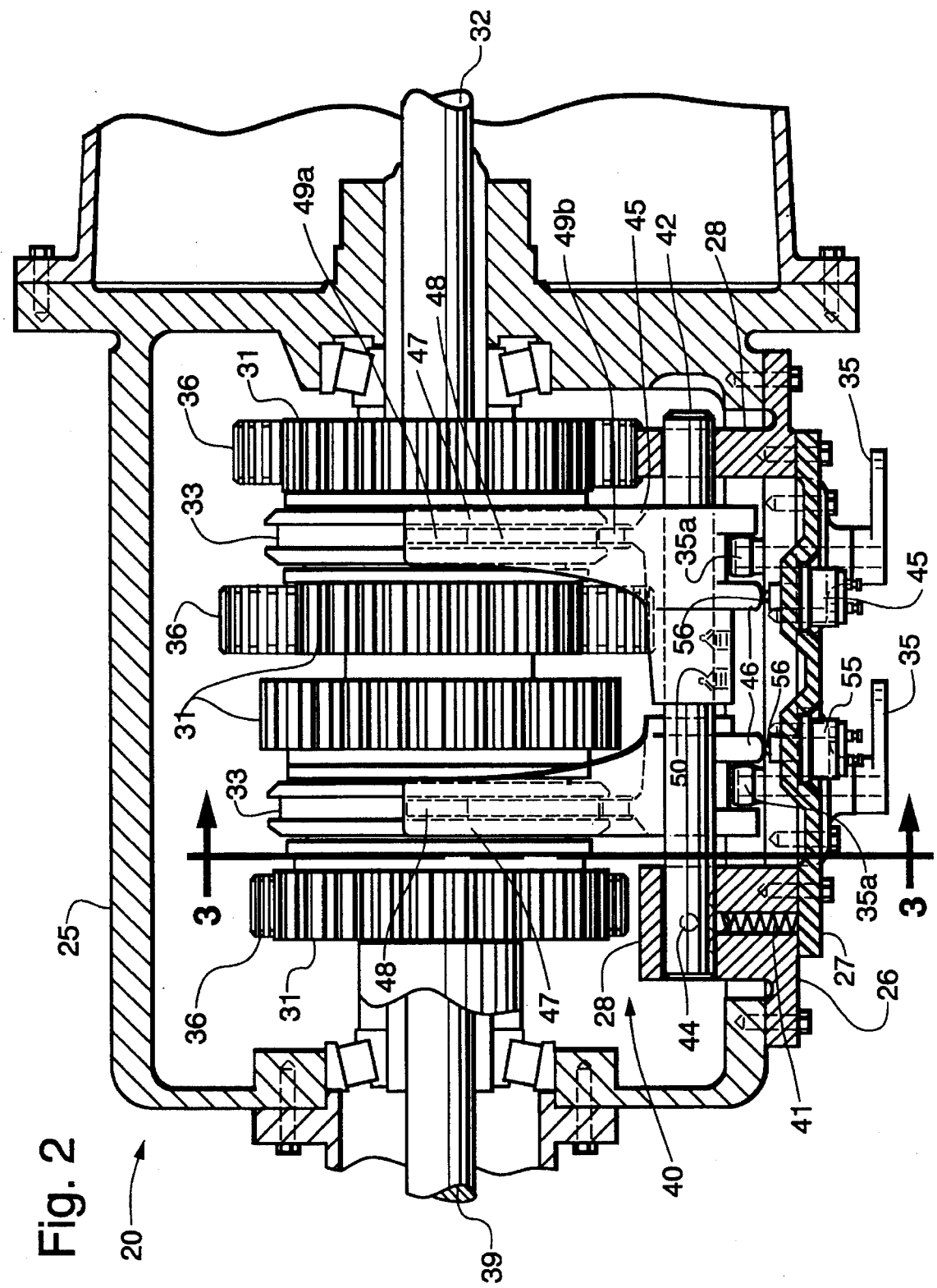
FIG. 2 is an enlarged partial cross-sectional view of the transmission taken along lines 2—2 of FIG. 1, looking downwardly into the top of the transmission.
Figure 3:
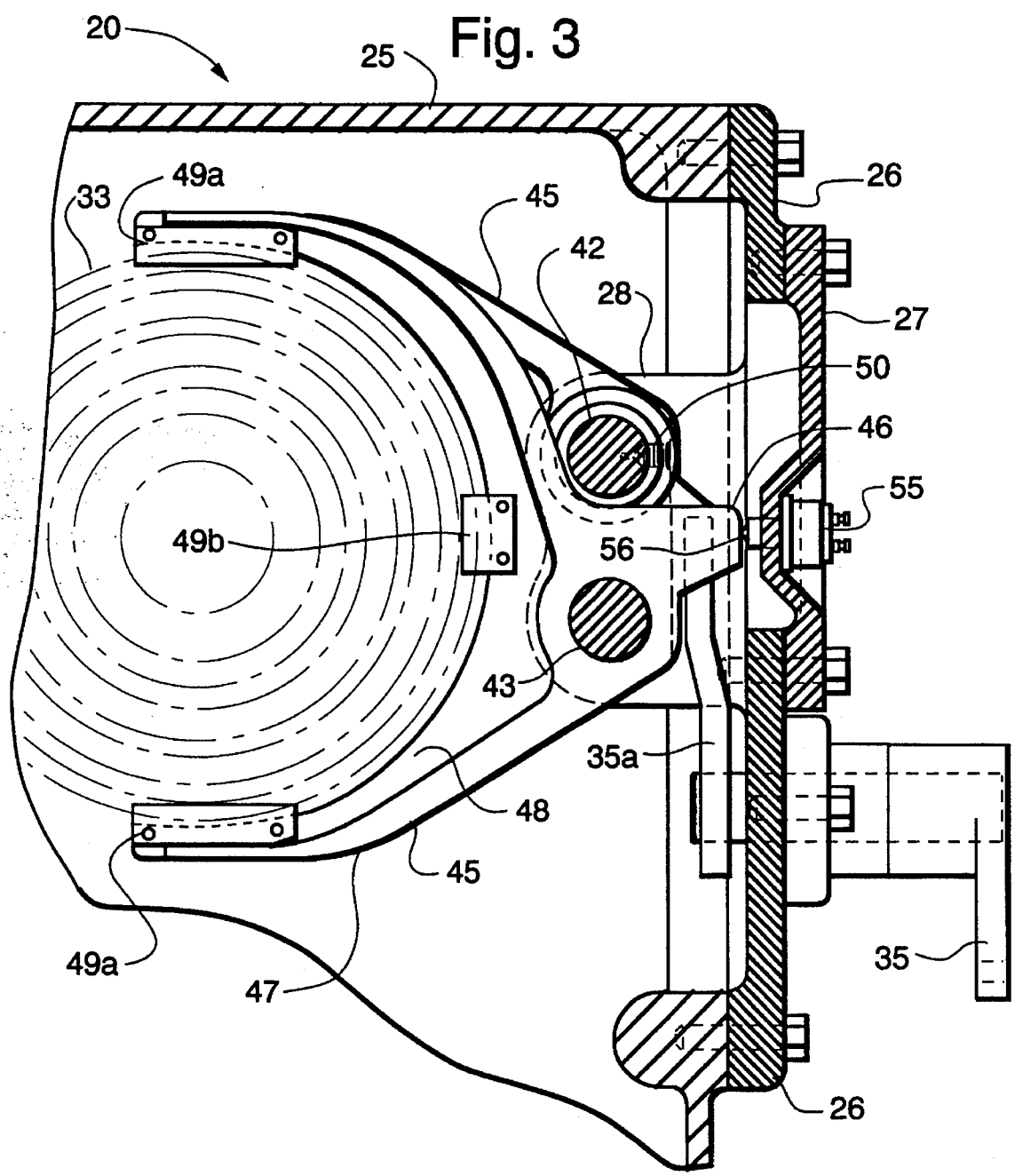
FIG. 3 is a partial cross-sectional view of the transmission taken along lines 3—3 of FIG. 2 to depict an elevational view of the upper part of the transmission.
Figure 4:
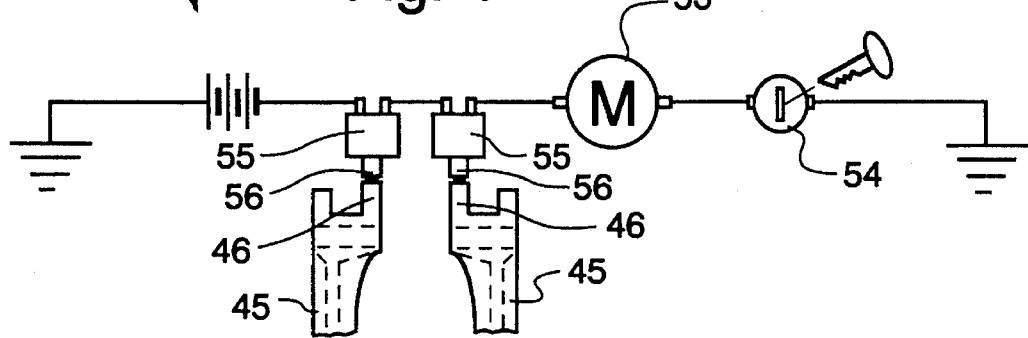
FIG. 4 is a schematic diagram of the electrical ignition system incorporating the shift fork position sensors.

Referring now to FIGS. 2 and 3, the details of the transmission 20 can best be seen. The upper part 23 of the transmission 20 is provided with a set of four first gears 31 rotatably mounted on a shaft 32 receiving operative rotational power from the engine 12. Between each of the arranged pairs of the set of first gears 31 is positioned a laterally shiftable synchronizer 33 drivingly engaged with the shaft 32. Each synchronizer 33 is laterally positionable in one of three positions, a central neutral position and left and right engagement positions for engaging a corresponding one of the adjacent arranged pairs of the set of first gears 31.

The transmission control lever 21 is arranged in a conventional "H" pattern with the lever being positionable in one of the four legs of the standard "H" pattern to correspond to one of the four first gears 31. Accordingly, the control lever 21 is operable to effect a lateral shifting of one of the synchronizers 33 at a time to one of the engagement positions with the nonshifting synchronizer being positioned in its corresponding neutral position. As a result, only a selected one of the set of four first gears 31 can be drivingly engaged with the power input shaft 32 at a time to provide a selected speed of operation.

Each of the first gears 31 is engaged through a conventional power transfer apparatus (not shown) housed within the transmission 20 between the upper and lower parts 23, 24 to transfer rotational power to the set of four second gears 36 which are arranged in a similar configuration as the set of four first gears 31 in the upper part 23 of the transmission 20 and are selectably engageable through synchronizers (not shown) to select a range of output speeds to the output shaft 38 to deliver operative rotational power to the rear wheels 11 and to the output shaft 39 to deliver operative rotational power to the rear wheels 19.

The transmission housing 25 is provided with an upper primary cover 26 detachably mounted to the housing 25 to provide access to the upper part 23 of the transmission 20 for service, repair and adjustment thereof, and a lower primary cover 29 detachably mounted to the housing 25 to provide access to the lower part 24 of the transmission 20. The upper primary cover 26 is also provided with a secondary cover 27 detachably mounted to the upper primary cover 26 to provide access to the shift fork assembly 40 in the upper part 23 of the transmission 20. All of the covers 26, 27 and 29 are sealed against, respectively, the housing 25 and the upper primary cover 26 to prevent the leakage of lubrication fluids from within the transmission 20.

The shift fork assembly 40 in the upper part 23 of the transmission 20 includes a pair of shift forks 45, each of which is mounted on a corresponding upper and lower shift rail 42, 43 and is engaged with a corresponding synchronizer 33. Each shift fork 45 is formed with a base portion 46, having a bore extending transversely therethrough for the passage of the corresponding shift rail 42, 43 on which the shift fork 45 is mounted, and an integral, U-shaped fork portion 47 extending outwardly from the base portion 46 to opposingly engage the corresponding synchronizer 33. The fork portion 47 is formed with a central web portion 48 to which is mounted first and second opposing wear pads 49a and a third central wear pad 49b for engagement of the synchronizer 33.

As is explained in greater detail in co-pending U.S. patent application Ser. No. 08/, the base portion 46 of each shift fork 45 is fixed to the corresponding shift rail 42, 43 by an offset set screw adjustment mechanism 50 to prevent any relative sliding movement therebetween, yet allow for a minute positional adjustment of the shift fork 45 relative to the synchronizer 33.

The shift fork assembly 40 is supported from the upper primary cover 26. The upper and lower shift rails 42, 43 are slidably received within mounting members 28 formed as an integral part of the upper primary cover 26 and extending inwardly therefrom into the interior of the transmission housing 25. Accordingly, the removal of the upper primary cover 26 from the transmission housing 25 includes the removal of the shift fork assembly 40 from the transmission 20. Access to the adjustment mechanism 50 can be had through the secondary cover 27 without requiring the removal of the larger upper primary cover 26 from the housing 25.

The shift fork assembly 40 further includes a conventional spring-loaded ball detent mechanism 41 interacting independently with each of the upper and lower shift rails 42, 43 to restrain the shift rails 42, 43 in the position in which they have been respectively moved. A conventional shift rail interlock 44 interacts between the upper and lower shift rails 42, 43 to prevent one shift rail from moving out of the neutral position whenever the other shift rail is already out of the neutral position. The interlock 44 is in the form of a generally vertically oriented pin transversely fixed within the mounting portion 28 that is vertically movable to be positionable within a recess formed in the opposing shift rail whenever the other shift rail is moved out of the neutral position. Accordingly, the opposing shift rail cannot be moved out of the neutral position until the other shift rail has returned to the neutral position to allow the recess formed therein to align with the pin to accept the vertical movement thereof when the opposing shift rail is moved out of the neutral position.

The shift fork position sensors 55 are mounted directly on the secondary cover 27 to project therethrough for engagement directly with the base portion 46 of the corresponding shift fork 45. When the respective shift fork 45 is in its neutral position, the base portion 46 depresses the switch 56 to close the electrical circuit 52 passing through the position sensor 55, as is depicted in the electrical schematic of FIG.

4. If the shift fork 45 is in one of its respective engagement positions, the corresponding switch 56 will not be depressed, leaving the circuit 52 open. Unless both shift fork position sensors 55 are indicating the corresponding shift fork 45 is in the neutral position, the electrical circuit 52 to activate the tractor starter motor 53 via a conventional manipulation of the key switch 54 will not be closed and the tractor T cannot be started.

As is best seen in FIGS. 1–3, the shifting of the transmission 20 is accomplished by the manipulation of the control lever 21 in the operator's cab 15 to effect a movement of the corresponding push/pull cable 22 connected to the shift lever 35 pivotally mounted on the exterior side of the primary cover 26 to effect a pivotal movement thereof in a conventional manner. The pivotal movement of the shift lever 35 results in a transverse movement of the corresponding shift arm 35a on the interior side of the primary cover 26. The resultant movement is a transverse shifting of the corresponding shift fork 45 to move the engaged synchronizer 33, which in turn opens the electrical circuit 52 due to the disengagement of the corresponding position sensor 55.

The servicing of the shift fork assembly 40 is enhanced by the mounting of the assembly 40 on the upper primary cover 26. Whenever the upper primary cover 26 is removed, the shift fork assembly 40 is removed from the transmission 20 along with the cover 26, which can then be taken to a work bench for repair or service, such as the replacement of the wear pads 49a, 49b or other components. Once the upper primary cover 26 is mounted to the housing 25 and the shift forks 45 engaged with the corresponding synchronizers 33, the proper spacial relationship between the individual shift forks 45 and the corresponding synchronizer can be accurately adjusted by an appropriate manipulation of the adjustment mechanism 50 to locate the base portion 46 of the shift fork 45 along the length of the corresponding shift rail 42, 43 until the synchronizer 33 is properly and accurately positioned.

It should also be noted that the shift rail interlock 44 and the detent mechanism 41 are also removed with and as part of the shift fork assembly 40 for proper servicing on a work bench of the like. One skilled in the art will readily recognize that the normal servicing of small component items such as the detent mechanism 41 while the shift fork assembly 40 is still mounted within the transmission housing 25 can result in the small components being lost within the interior of the transmission 20, which would be inherently damaging to the normal operation of transmission 20.

The mounting of the shift fork position sensors 55 on the secondary cover 27 permits the position sensors 55 to be removed with the secondary cover 27 for servicing or replacement at a remote location, such as the operator's work bench. Proper design of the secondary cover 27 locates the position sensors 55 relative to the upper primary cover 26 and the synchronizers 33 within the transmission housing 25. The minute adjustment allowed by the adjustment mechanism 50 will not result in sufficient transverse movement of the shift fork base portion 46 to diminish the operative performance of the direct relationship between the position sensor 55 and the shift fork 45.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor transmission having a housing including a removable cover to provide access to the interior of said housing; an input shaft to provide a source of rotational power; an output shaft; a plurality of gears rotatably supported within said housing and operably connected to said input shaft and said output shaft for selectively varying a speed of operation of said output shaft for a given speed of operation of said input shaft; a shift fork assembly mounted within said housing and including at least one shift fork to effect a selectable shifting of said gears for interengagement therebetween in a predefined manner to provide said different speeds of operation of said output shaft, each said shift fork being selectively positionable in at least one engagement position in which said input and output shafts are operatively coupled and a neutral position in which said output shaft is disengaged from said input shaft; and a position sensor cooperatively associated with each said shift fork to sense the positioning of the corresponding said shift fork in the neutral position, the improvement comprising:

each said position sensor being mounted on a removable access cover to be located in direct contact with the corresponding said shift fork such that the movement of said corresponding shift fork into said neutral position effects a movement of a sensor switch to signal the status thereof.

2. The tractor transmission of claim 1 wherein said shift fork assembly is mounted on a transmission cover to be removable therewith as a unit, said shift fork assembly including at least one shift rail on which a corresponding said shift fork is mounted, an adjustment mechanism interengaged between each corresponding said shift fork and shift rail to effect relative positional displacement therebetween for properly aligning said shift fork with a corresponding shift collar associated with one at least one of said gears to effect the selected interengagement between said gears, and a detent mechanism releasably holding said shift fork in a selected position.

3. The tractor transmission of claim 2 wherein said removable access cover is mounted to said transmission cover such that said position sensors are removable from said shift fork assembly.

4. The tractor transmission of claim 3 wherein each said position sensor includes a switch electrically coupled to an electrical circuit containing a key switch and a starter motor, said electrical circuit being closed to permit an actuation of said starter motor only when each said shift fork is in said neutral position to close the switch on the corresponding said position sensor.

5. A tractor transmission comprising:

a housing defining a hollow shell including at least one opening therein to provide access into the interior of said housing, said housing rotatably mounting an input shaft and an output shaft;

a transmission cover removably mounted on said housing to cover said at least one opening;

a plurality of gears rotatably mounted within said housing and being operatively connected to said input and output shafts, at least one of said gears having a shiftable component to permit the selective engagement between selected pairs of said gears to effect differing speeds of rotation of said output shaft for a given speed of rotation of said input shaft;

a shift fork assembly mounted to said transmission cover to be removable from said housing as a unit therewith, said shift fork assembly including at least one shift rail, a shift fork mounted on said at least on shift rail and being movable between at least one engagement position in which said input and output shafts are operatively coupled and a neutral position in which said input and output shafts are disengaged, and a detent mechanism releasably holding said shift fork in a selected position;

a secondary cover removably mounted on said transmission cover to be independently removable from said transmission cover to permit access to said shift fork assembly within said transmission housing; and a position sensor mounted on said secondary cover to be directly engaged with each said shift fork to signal the movement thereof into said neutral position, said position sensor being removable from said transmission housing with said secondary cover.

6. The tractor transmission of claim 5 wherein each said position sensor includes a switch electrically coupled to an electrical circuit containing a key switch and a starter motor, said electrical circuit being closed to permit an actuation of said starter motor only when each said shift fork is in said neutral position to close the switch on the corresponding said position sensor.

* * * * *